(12) United States Patent
Song et al.

(10) Patent No.: US 7,248,766 B2
(45) Date of Patent: Jul. 24, 2007

(54) WAVELENGTH DIVISION COUPLER AND OPTICAL TRANSCEIVER USING THE SAME

(75) Inventors: Jeong-Hwan Song, Seoul (KR); Yun-Kyung Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/497,040

(22) Filed: Aug. 1, 2006

(65) Prior Publication Data

US 2007/0031085 A1 Feb. 8, 2007

(30) Foreign Application Priority Data

Aug. 3, 2005 (KR) .................. 10-2005-0070935

(51) Int. Cl.
*G02B 6/34* (2006.01)
(52) U.S. Cl. ........................................ 385/37
(58) Field of Classification Search ............. 385/9–10
See application file for complete search history.

(56) References Cited

U.S. PATENT DOCUMENTS

| 5,574,807 | A | * | 11/1996 | Snitzer | 385/24 |
| 6,038,359 | A | * | 3/2000 | Moslehi et al. | 385/42 |
| 6,226,428 | B1 | * | 5/2001 | Saito et al. | 385/42 |
| 6,522,795 | B1 | * | 2/2003 | Jordan et al. | 385/10 |
| 6,665,473 | B2 | * | 12/2003 | Tseng et al. | 385/39 |
| 2006/0051022 | A1 | * | 3/2006 | Levner et al. | 385/37 |
| 2006/0140541 | A1 | * | 6/2006 | Gorni et al. | 385/50 |

OTHER PUBLICATIONS

C. Riziotis et al.; "Novel Full-Cycle-Coupler-Based Optical Add-Drop Multiplexer and Performance Characteristics at 40-Gb/s WDM Networks;" Journal of Lightwave Technology, vol. 21, No. 8, Aug. 2003; 10 pgs.

* cited by examiner

*Primary Examiner*—Michelle Connelly-Cushwa
*Assistant Examiner*—Chris Chu
(74) *Attorney, Agent, or Firm*—Cha & Reiter, LLC

(57) ABSTRACT

A wavelength division coupler capable of dividing and coupling at least three wavelengths is provided. The wavelength division coupler includes a first waveguide having a first end and a second end, a second waveguide having a third end and a fourth end, in which a section between the third end and the fourth end is located adjacently to one end of the first waveguide to form a mode coupling section for dividing or coupling an input light, and a Bragg zone having a Bragg grating in the mode coupling section formed in portions of die first waveguide and the second waveguide.

14 Claims, 4 Drawing Sheets

US 7,248,766 B2

WAVELENGTH DIVISION COUPLER AND OPTICAL TRANSCEIVER USING THE SAME

CLAIM OF PRIORITY

This application claims priority under 35 U.S.C. § 119 to an application entitled "Wavelength Division Coupler and Optical Transceiver Using the Same," filed in the Korean Intellectual Property Office on Aug. 3, 2005 and assigned Ser. No. 2005-70935, the contents of which are incorporated herein by reference.

BACKGROUND OF THE INVENTION

1. Field of the Invention

The present invention generally relates to an optical device capable of coupling or dividing light having at least three wavelengths, and in particular, to a wavelength division coupler including a directional coupler.

2. Description of the Related Art

In a bidirectional transmission/reception, each subscriber device or a central base station requires an optical transceiver, such as a three-wavelength division optical filter, capable of coupling or dividing different upward and downward light. The three-wavelength division optical filter has a structure in which a groove that cuts a portion where a two-branch waveguide is formed and an optical filter capable of selectively transmitting or reflecting a specific wavelength inserted into the groove. An arrayed waveguide grating may be used for the purposes of wavelength dividing or coupling process.

However, the volume of the arrayed waveguide grating or the three-wavelength division optical filter tends to increase in this type of application, and the optical filter experiences a loss depending on the coupling efficiency and the volume of the device. Moreover, when using the three-wavelength division optical filter or the arrayed waveguide grating, the operation process becomes complicated, and the cost of parts increases, thereby causing an increase in the manufacturing cost.

SUMMARY OF THE INVENTION

The present invention provides a wavelength division coupler capable of dividing and coupling at least three wavelengths, thus reducing signal loss and manufacturing cost.

In one embodiment, there is provided a wavelength division coupler including a first waveguide having a first end and a second end, a second waveguide having a third end and a fourth end, in which a section between the third end and the fourth end is located adjacently to one end of the first waveguide to form a mode coupling section for dividing or coupling an input light and a Bragg zone having a Bragg grating in the mode coupling section formed in portions of the first waveguide and the second waveguide.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Embodiments of the present invention will now be described in detail with reference to the annexed drawings. For the purposes of clarity and simplicity, a detailed description of known functions and configurations incorporated herein has been omitted for conciseness.

Figure 1:
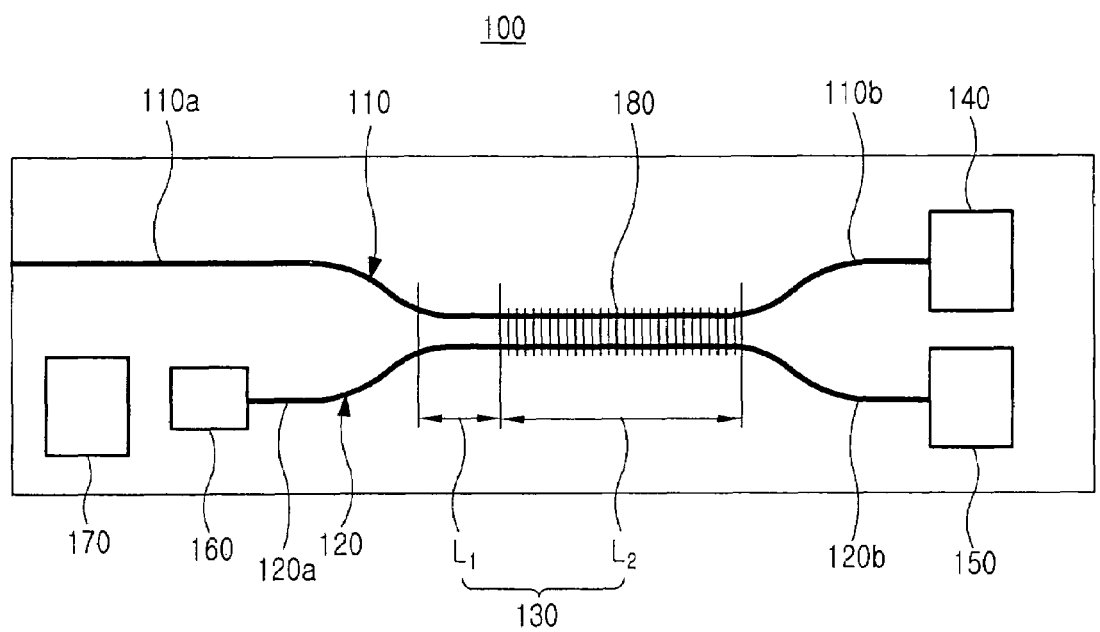
FIG. 1 illustrates a wavelength division coupler according to a first embodiment of the present invention.

FIG. 1 illustrates a wavelength division coupler 100 according to a first embodiment of the present invention. As shown, the wavelength division coupler 100 includes a first waveguide 110 including a first end 110a and a second end 110b, a second waveguide 120 including a third end 120a and a fourth end 120b, a mode coupling section 130 formed in portions of the first waveguide 110 and the second waveguide 120, a laser light source 160 connected to one end of the third end 120a, a first light receiving device 140 of an analog type connected to one end of the second end 110b, a second light receiving device 150 of a digital type connected to one end of the fourth end 120b, and a third light receiving device 170 for monitoring a light generated from the laser light source 160. The mode coupling section 130 is located between the first end 110a and the second end 110b of the first waveguide 110 and the third end 120a and the fourth end 120b of the second waveguide 120, and it includes a Bragg zone $L_2$ in which a Bragg grating 180 is formed and a non-grated zone $L_1$ in which the Bragg grating 180 is not formed.

The first end 110a of the first waveguide 110 serves as a common input/output end, and the second end 110b of the first waveguide 110 serves as an output end. A portion of the second waveguide 120 between the third end 120a and the fourth end 120 b is adjacent to a portion of the first waveguide 110 to form a mode coupling section 130 for dividing or coupling an input light. The third end 120a of the second waveguide 120 functions as an input end, and the fourth end 120b of the second waveguide 120 functions as an output end. Thus, a light input through the third end 120a of the second waveguide 120 is reflected off the Bragg grating 180 and then output through the first end 110a of the first waveguide 110, and a light input through the first end 110a of the first waveguide 110 from outside is divided into different wavelengths in the mode coupling section 130 and then output to the first light receiving device 140 and the second light receiving device 150 through the second end. 110b of the first waveguide 110 and the fourth end 120b of the second waveguide 120, respectively.

More specifically, a light of 1.49 μm generated from the laser light source 160 is reflected off the Bragg grating 180 and then output to outside through the first end 110a, and a light having at least two different wavelengths input from outside through the first end 110*a* is divided into wavelengths of 1.31 µm and 1.55 µm in the mode coupling section 130 and then output to the first light receiving device 140 and the second light receiving device 150 through the second end 110*b* and the fourth end 120*b*, respectively. The light of 1.49 µm is oscillated in the Bragg grating 180 formed in the Bragg zone $L_2$ of the mode coupling section 130 and then output to outside through the first end 110*a* facing the first light receiving device 140.

The bandwidth of the Bragg grating 180 is smaller than that of a conventional three-wavelength division optical filter by about 20 nm. Such a difference can be overcome by using the Bragg grating 180 as an input end of the laser light source 160. The Bragg zone $L_2$ of the mode coupling section 130 can be determined as follows:

$$R = \tanh^2(sL_2) \frac{|k|^2}{|s|^2 + |k_{ab}|^2 \tanh^2(sL_2)}, \quad (1)$$

where R indicates the reflectivity of the Bragg grating 180, $L_2$ indicates the length of the Bragg grating 180, k indicates the bonding strength of the Bragg grating 180, $k_{ab}$ indicates the coupling coefficient of the mode coupling section 130, and s indicates the square root of a difference between $|k|$ and $|k_{ab}|$.

The non-grated zone $L_1$ can be determined as follows:

$$\tan(2|k_{ab}|L_1^{opt}) = \frac{s}{|k_{ab}|\tanh(sL_2)}, \quad (2)$$

where $L_1$ indicates the length of the non-grated zone, and s indicates the square root of a difference between $|k|$ and $|k_{ab}|$.

s in Equations (1) and (2) can be expressed as follows:

$$s = (|k|^2 - |k_{ab}|^2)^{1/2} \quad (3)$$

Figure 2:
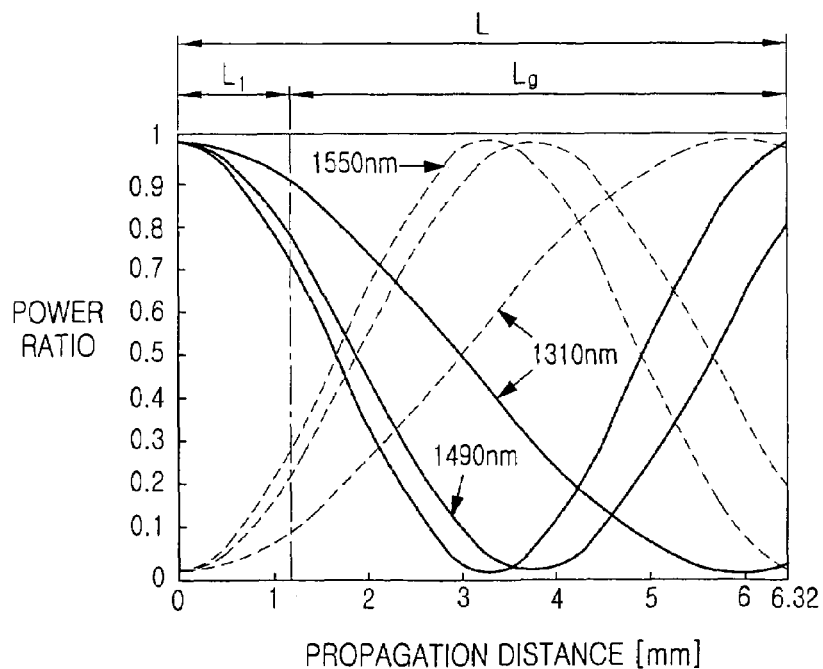
FIG. 2 illustrates a graph for explaining the characteristics of wavelength division of the wavelength division coupler of FIG. 1 according to different coupling coefficients.

FIG. 2 shows the characteristics of wavelength division of the wavelength division coupler 100 according to different coupling coefficients, in which a design using $k_{ab}$ when the laser light source 160 generates an optical signal of 1.49 µm is taken as an example. In FIG. 2, the length of the mode coupling section 130 is 6.32 mm, and in this case, a light may be divided into wavelengths of 1.31 µm and 1.55 µm. When $L_1$ is 1.35 mm and the Bragg grating 180 is fanned after the non-grated zone corresponding to 1.35 mm, a light oscillated to a wavelength of 1.49 µm is output through the first end 110*a* of the first waveguide 110.

Figure 3A:
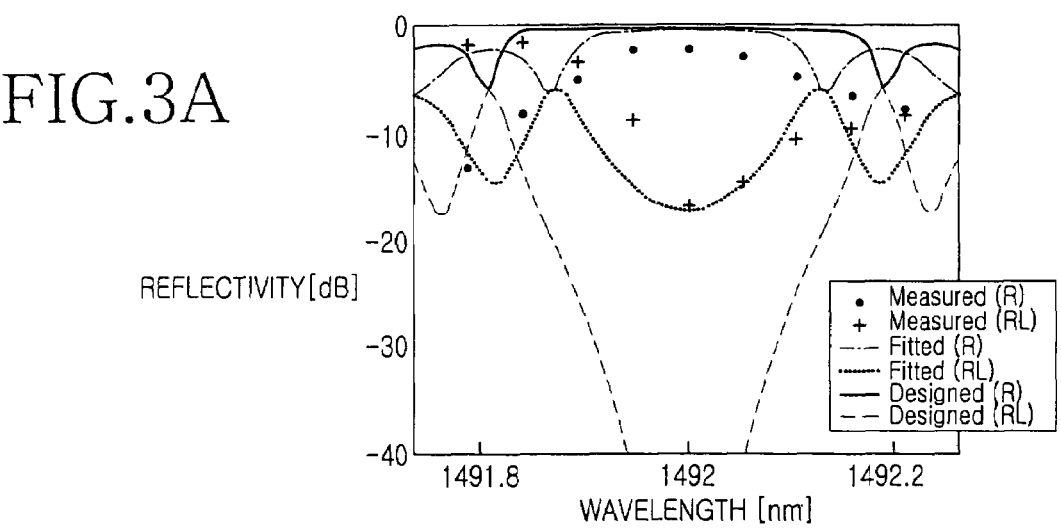
FIGS. 3A to 3C illustrate graphs for explaining the characteristics of optical losses in components of the wavelength division coupler of FIG. 1.
Figure 3B:
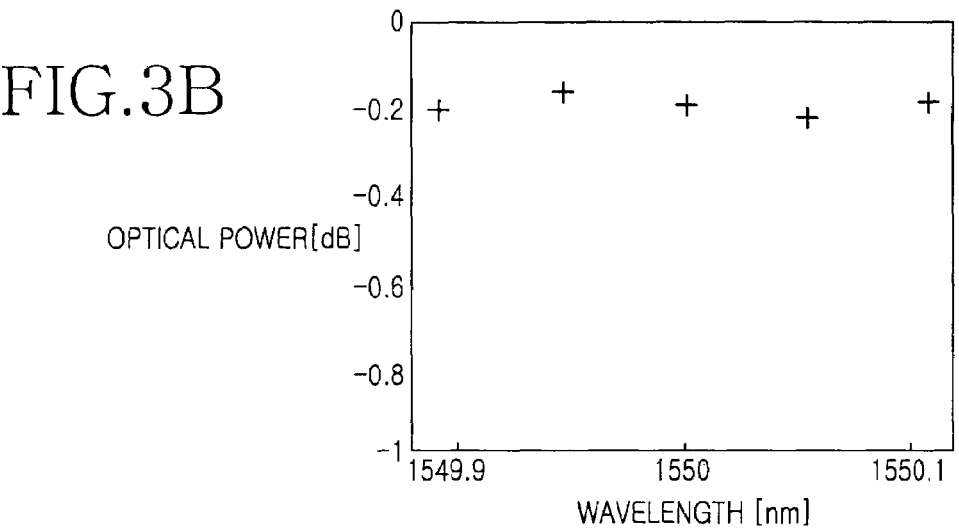
Figure 3C:
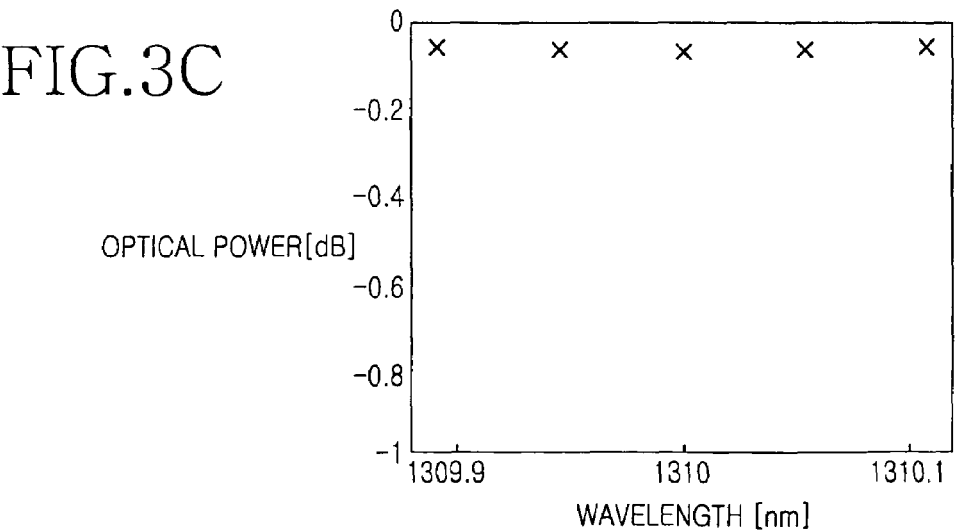

FIG. 3 illustrates the characteristics of optical losses in components of the wavelength division coupler 100. In particular, FIG. 3(*a*) illustrates the feedback loss of the 1.49 µm light reflected off the Bragg grating 180, in which the feedback loss is 2 dB. FIG. 3(*b*) illustrates the output of a light detected by the first light receiving device 140 through the second end 110*b*, and FIG. 3(*c*) illustrates the output of a light detected by the second light receiving device 150 through the fourth end 120*b*. FIG. 3(*a*) and (*b*), a loss is smaller than 0.2 dB.

Figure 4:
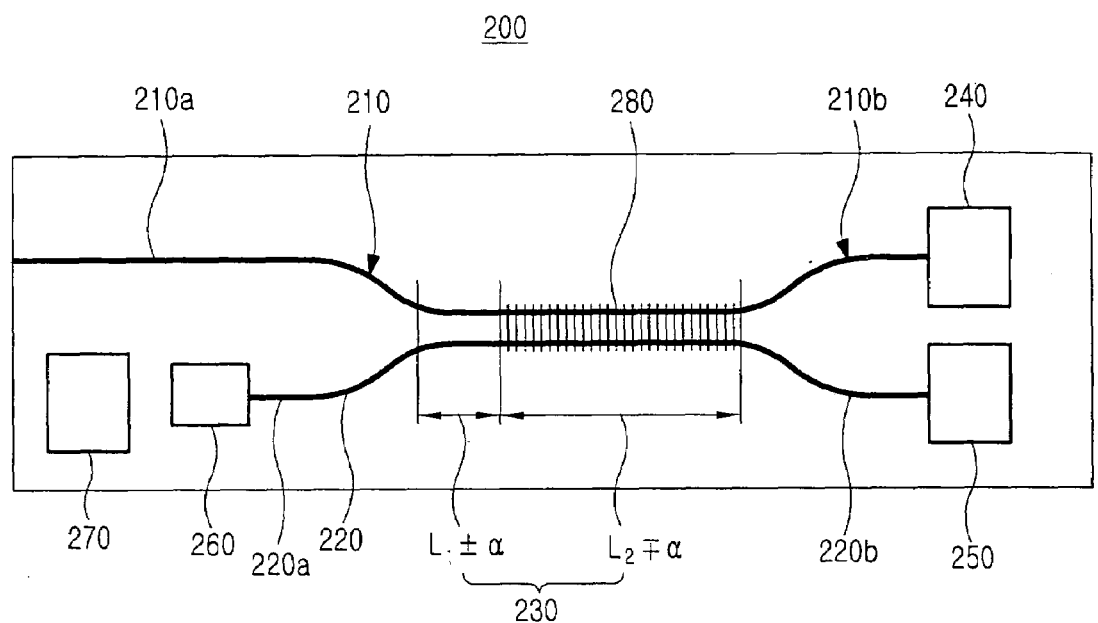
FIG. 4 illustrates a wavelength division coupler according to a second embodiment of the present invention.

FIG. 4 illustrates a wavelength division coupler 200 according to a second embodiment of the present invention. As shown, the wavelength division coupler 200 includes a first waveguide 210 including a first end 210*a* and a second end 210*b*, a second waveguide 220 including a third end 220*a* and a fourth end 220*b*, a mode coupling section 250 formed in portions of the first waveguide 210 and the second waveguide 220, a laser light source 260, a first light receiving device 240 of an analog type, a second light receiving device 250 of a digital type, and a third light receiving device 270 for monitoring a light generated from the laser light source 260.

The mode coupling section 230 corresponds to a section where the first waveguide 210 and the second waveguide 220 are adjacent to each other, and includes a Bragg zone $L_2 \pm \alpha$ where a Bragg grating 280 is formed and a non-grated zone $L_1 \pm \alpha$ where the Bragg grating 280 is not formed.

Figure 5:
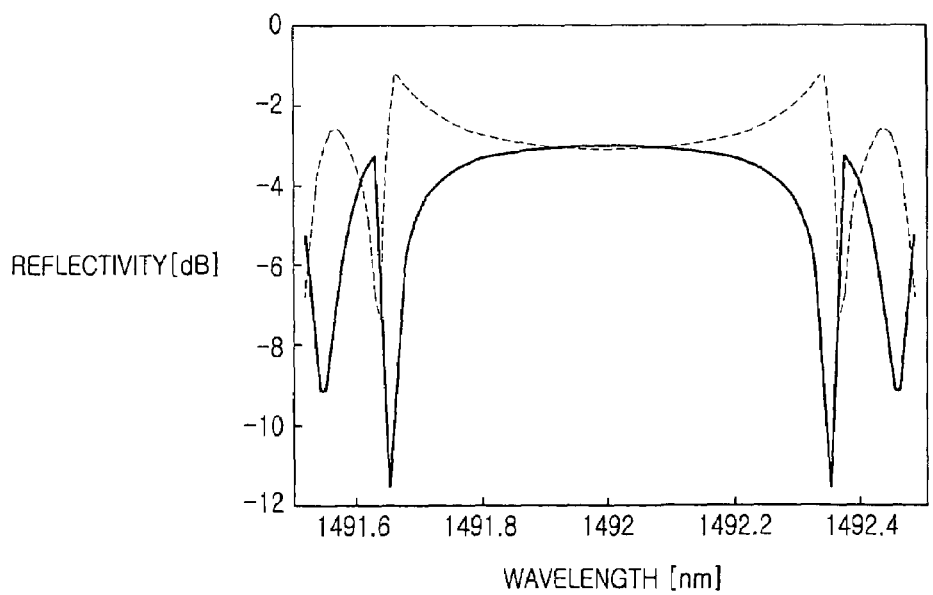
FIG. 5 illustrates a graph for explaining a feedback loss of the wavelength division coupler of FIG. 4 due to a non-grated zone illustrated in FIG. 4.

In the current embodiment of the present invention, the Bragg zone $L_2 \pm \alpha$ and the non-grated zone $L_1 \pm \alpha$ are not optimized by Equations (1) through (3). FIG. 5 illustrates a graph for explaining a feedback loss of the wavelength division coupler 200 according to the lengths of the Bragg zone $L_2 \pm \alpha$ and the non-grated zone $L_1 \pm \alpha$. A dotted line represents a state where the length of the non-grated zone $L_1 \pm \alpha$ is not optimized as illustrated in FIG. 4 and it can be seen that the dotted line indicates a larger feedback loss than a solid line. The feedback loss is generated between the laser light source 260 and the Bragg a zone $L_2 \pm \alpha$, and a light having the feedback loss is oscillated between the laser light source 260 and the Bragg zone $L_2 \pm \alpha$ and then output through the first end 210*a* of the first waveguide 210 facing the first receiving device 240.

Only when the Bragg grating 280 formed in the Bragg zone $L_2 \pm \alpha$ has an absolute reflectivity of ~30 dB, it can divide a light of each wavelength and prevent the light having the feedback loss from being directly output to the first light receiving device 240 and the second light receiving device 250 without being oscillated. Since the Side Mode Suppression Ratio (SMSR) of the light oscillated between the non-grated zone $L_1 \pm \alpha$ and the laser light source 260 due to the feedback loss is greatly improved, it can be easily anticipated that the crosstalk of a light output to the first light receiving device 240 and the second light receiving device 250 will be reduced.

Figure 6:
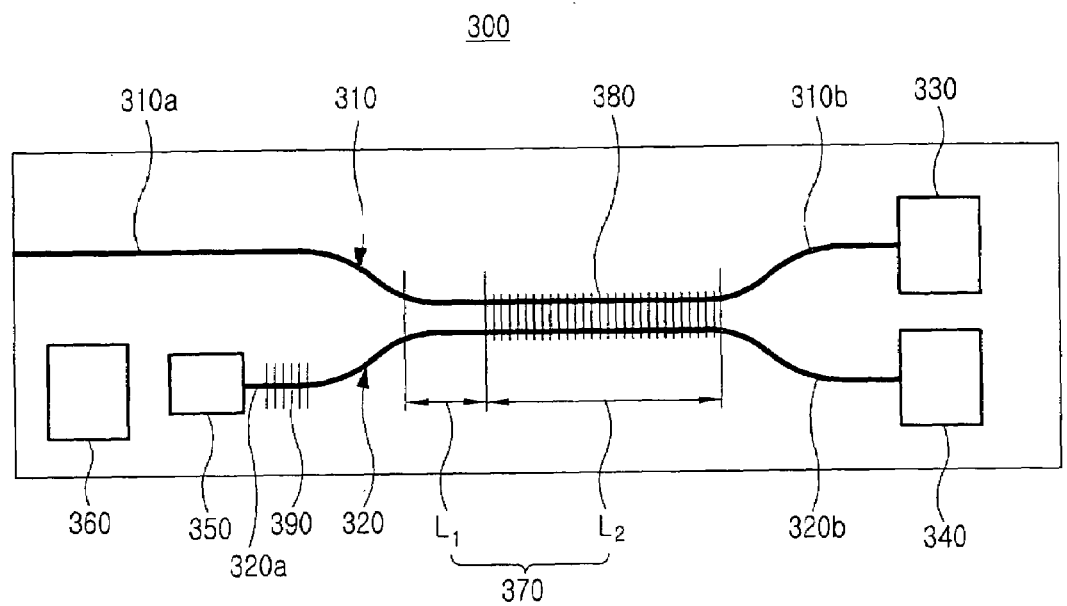
FIG. 6 illustrates a wavelength division coupler according to a third embodiment of the present invention.

FIG. 6 illustrates a wavelength division coupler 300 according to a third embodiment of the present invention. As shown, the wavelength division coupler 300 includes a first waveguide 310 having a first end 310*a* and a second end 310*b*, a second waveguide 320 having a third end 320*a* and a fourth end 320*b*, a mode coupling section 370 formed in portions of the first waveguide 310 and the second waveguide 320, a laser light source 350 connected to the third end 320*a*, a first light receiving device 330 of an analog type connected to the second end 310*b*, a second light receiving device 340 of a digital type located at one end of the second waveguide 320, a third light receiving device 360 for monitoring a light generated from the laser light source 350, and a resonating grating 390.

The resonating grating 390 is formed between the mode coupling section 370 and the laser light source 350 on the second waveguide 320 and resonates a light generated from the laser light source 350 to output the resonated light to the mode coupling section 370.

The mode coupling section 370 corresponds to a section where the first waveguide 310 and the second waveguide 320 are adjacent to each other, and includes a Bragg zone $L_2$ in which a Bragg grating 380 is formed and a non-grated zone $L_1$ in which the Bragg grating 380 is not formed. Hence, the Bragg grating in FIG. 6 can be optimized by equations (1)–(3).

The mode coupling section 370 outputs a light input from the resonating grating 390 to outside through the first end 310a and outputs a light having different wavelengths input from outside through the first end 310a to the first light receiving device 330 and the second light receiving device 340 according to the wavelengths.

Figure 7:
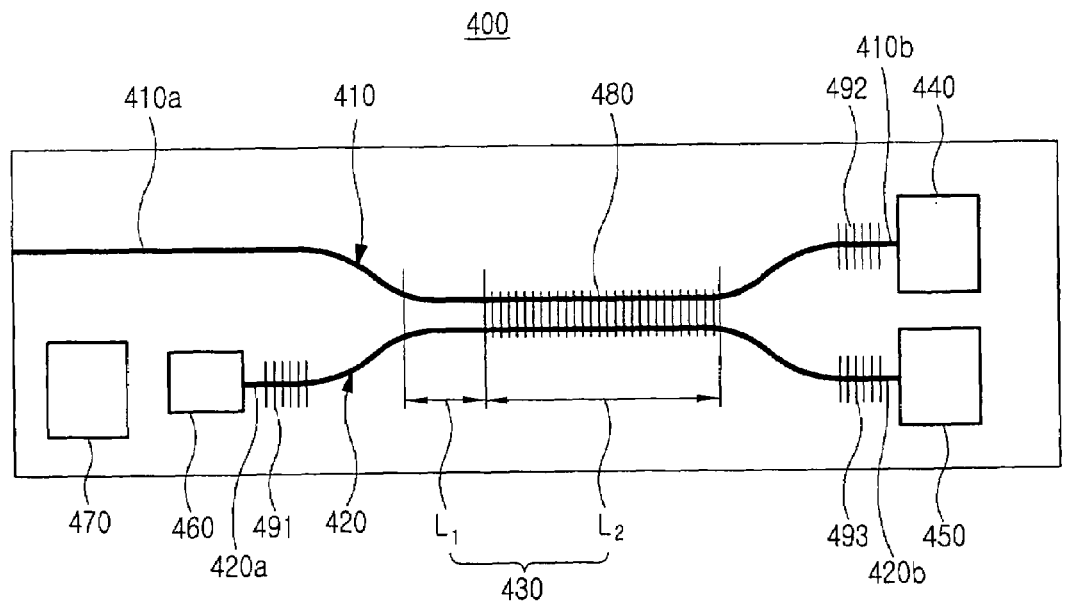
FIG. 7 illustrates a wavelength division coupler according to a fourth embodiment of the present invention.

FIG. 7 illustrates a wavelength division coupler 400 according to a fourth embodiment of the present invention. As shown, the wavelength division coupler 400 includes a first waveguide 410 having a first end 410a and a second end 410b, a second waveguide 420 having a third end 420a and a fourth end 420b, a mode coupling section 430 formed in portions of the first waveguide 410 and the second waveguide 420, a laser light source 460 connected to the third end 420a, a first light receiving device 440 of an analog type connected to the second end 410b, a second light receiving device 450 of a digital type connected to the fourth end 420b, a third light receiving device 470 for monitoring a light generated from the laser light source 460, a resonating grating 491, and first and second reflecting gratings 492 and 493.

The resonating grating 491 is formed between the mode coupling section 430 and the laser light source 460 on the second waveguide 420 and resonates a light generated from the laser light source 450 to output the resonated light to the mode coupling section 430.

The mode coupling section 430 corresponds to a section where the first waveguide 410 and the second waveguide 420 are adjacent to each other, and includes a Bragg zone $L_2$ in which a Bragg grating 480 is formed and a non-grated zone $L_1$ in which the Bragg grating 480 is not formed. The mode coupling section 430 outputs a light input from the resonating grating 491 to outside through the first end 410a of the first waveguide 410 and outputs a light of at least two different wavelengths input from outside through the first end 410a to the first reflecting grating 492 and the second reflecting grating 493 according to the wavelengths. Note that the Bragg grating in FIG. 7 can be optimized by equations (1)–(3).

The first reflecting grating 492 and the second reflecting grating 493 minimize crosstalk and improve wavelength selectivity with respect to a light.

As explained above, a wavelength division coupler according to the present invention is more economical and easier to manufacture and miniaturize. Moreover, by minimizing a feedback loss, the wavelength division coupler can improve the SMSR of a transmitter and is favorable for long-distance transmission.

While the present invention has been shown and described with reference to preferred embodiments thereof, it will be understood by those skilled in the art that various changes in form and details may be made therein without departing from the spirit and scope of the invention.

What is claimed is:

1. A wavelength division coupler comprising:
   a first waveguide having a first end and a second end;
   a second waveguide having a third end and a fourth end, in which a section between the third end and the fourth end is located adjacent to one end of the first waveguide to form a mode coupling section;
   a Bragg zone having a Bragg grating formed in portions of the first waveguide and the second waveguide of the mode coupling section,
   wherein, the mode coupling section further includes a non-grated zone in which the Bragg grating is not provided and the length of the non-grated zone is determined as follows:

$$\tan(2|k_{ab}|L_1^{opt}) = \frac{s}{|k_{ab}|\tanh(sL_2)},$$

where $L_1$ indicates the length of the non-grated zone and s indicates the square root of a difference between $|k|$ and $|k_{ab}|$.

2. The wavelength division coupler of claim 1, wherein the length of the Bragg zone is determined as follows:

$$R = \tanh^2(sL_2)\frac{|k|^2}{|s|^2 + |k_{ab}|^2\tanh^2(sL_2)},$$

where R indicates the reflectivity of the Bragg grating, $L_2$ indicates the length of the Bragg grating, k indicates the bonding strength of the Bragg grating, $k_{ab}$ indicates the coupling coefficient of the mode coupling section, and s indicates the square root of a difference between $|k|$ and $|k_{ab}|$.

3. The wavelength division coupler of claim 1, further comprising:
   a laser light source at one end of the third end;
   a first light receiving device, wherein the first light receiving device is analog device at one end of the second end; end
   a second light receiving device, wherein the second light receiving device is a digital device at one end of the fourth end.

4. The wavelength division coupler of claim 3, further comprising a third light receiving device for monitoring a light generated from the laser light source at one end of the third end.

5. The wavelength division coupler of claim 3, further comprising a resonating grating formed at one end of the third end adjacent to the laser light source to resonate a light generated from the laser light source and output the resonated light to outside.

6. The wavelength division coupler of claim 3, further comprising:
   a first reflecting grating formed at one end of the second end.

7. The wavelength division coupler of claim 3, further comprising:
   a second reflecting grating formed at one end of the fourth end.

8. The wavelength division coupler of claim 3, further comprising:
   a first reflecting grating formed at one end of the second end; and
   a second reflecting grating formed at one end of the fourth end.

9. The method of claim 3, further providing a resonating grating formed at one end of the third end adjacent to the laser light source to resonate a light generated from the laser light source and output the resonated light to outside.

10. A method of providing a wavelength division coupler comprising:
    providing a first waveguide having a first end and a second end;
    providing a second waveguide having a third end and a fourth end near the first waveguide to form a mode coupling section therebetween; and forming a Bragg grating formed in the first waveguide and the second waveguide of the mode coupling section, wherein mode coupling section is further formed to include a non-grated zone in which the Bragg grating is not provided and the length of the non-grated zone is determined as follows:

$$\tan(2|k_{ab}|L_1^{opt}) = \frac{s}{|k_{ab}|\tanh(sL_2)},$$

where $L_1$ indicates the length of the non-grated zone and s indicates the square root of a difference between |k| and |$k_{ab}$|.

11. The method of claim 10, wherein the length of the Bragg zone is determined as follows:

$$R = \tanh^2(sL_2)\frac{|k|^2}{|s|^2 + |k_{ab}|^2\tanh^2(sL_2)},$$

where R indicates the reflectivity of the Bragg grating, $L_2$ indicates the length of the Bragg grating, k indicates the bonding strength of the Bragg grating, $k_{ab}$ indicates the coupling coefficient of the mode coupling section, and s indicates the square root of a difference between |k| and |$k_{ab}$|.

12. The method of claim 10, further comprising:

providing a laser light source at one end of the third end;

providing a first light receiving device, wherein the first light receiving device is an analog device at end of the second end; and providing a second light receiving device, wherein the second light receiving device is of a digital device at one end of the fourth end.

13. The method of claim 12, further providing a third light receiving device for monitoring a light generated from the laser light source at one end of the third end.

14. The method of claim 12, further providing a first reflecting grating formed at one end of the second end and a second reflecting grating formed at one end of the fourth end.

* * * * *